United States Patent
Chin

(10) Patent No.: US 8,884,888 B2
(45) Date of Patent: Nov. 11, 2014

(54) ACCELEROMETER DETERMINED INPUT VELOCITY

(75) Inventor: Robert Michael Chin, San Francisco, CA (US)

(73) Assignee: Apple Inc., Cupertino, CA (US)

(*) Notice: Subject to any disclaimer, the term of this patent is extended or adjusted under 35 U.S.C. 154(b) by 557 days.

(21) Appl. No.: 12/871,507

(22) Filed: Aug. 30, 2010

(65) Prior Publication Data

US 2012/0050176 A1    Mar. 1, 2012

(51) Int. Cl.

| G06F 3/041 | (2006.01) |
| G10H 1/055 | (2006.01) |
| G06F 3/0488 | (2013.01) |
| A63F 13/20 | (2014.01) |
| A63F 13/40 | (2014.01) |
| G06F 3/038 | (2013.01) |
| G10H 1/34 | (2006.01) |
| G10H 1/46 | (2006.01) |

(52) U.S. Cl.
CPC .......... *A63F 13/06* (2013.01); *A63F 2300/105* (2013.01); *G06F 2203/0381* (2013.01); *G10H 1/055* (2013.01); *G10H 2210/211* (2013.01); *A63F 2300/8047* (2013.01); *A63F 2300/6081* (2013.01); *G06F 3/04883* (2013.01); *G10H 2230/015* (2013.01); *G10H 2220/241* (2013.01); *G10H 2220/096* (2013.01); *G10H 2220/395* (2013.01); *A63F 13/10* (2013.01); *G06F 3/038* (2013.01); *G10H 2230/065* (2013.01); *G10H 2240/056* (2013.01); *G10H 1/34* (2013.01); *A63F 2300/1075* (2013.01); *A63F 2300/6045* (2013.01); *G10H 1/46* (2013.01)
USPC .......................................... 345/173

(58) Field of Classification Search
CPC ...... G06F 3/043; G06F 3/0433; G06F 3/0436
USPC .......................................... 345/173
See application file for complete search history.

(56) References Cited

U.S. PATENT DOCUMENTS 5,581,484 A    12/1996 Prince
6,937,272 B1 *  8/2005 Dance .................. 348/208.2
(Continued)

FOREIGN PATENT DOCUMENTS

| WO | 2006/017612 | 2/2006 |
| WO | 2009/104933 | 8/2009 |
| WO | 2009/108029 | 9/2009 |

OTHER PUBLICATIONS

Apple iTunes App Store, "Zen Piano—Use the Force," GreatApps Ltd, London, UK (Available online at http://itunes.apple.com/us/app/zen-piano-use-the-force/id315585257?mt=8, downloaded Jul. 20, 2010).

Apple iTunes App Store, "FreePiano+", Tekunodo, Japan (Available online at http://itunes.apple.com/us/app/freepiano/id330945465?mt=8, downloaded Jul. 20, 2010).

(Continued)

*Primary Examiner* — Kent Chang
*Assistant Examiner* — Nathan Brittingham
(74) *Attorney, Agent, or Firm* — Fish & Richardson P.C.

(57) ABSTRACT

The disclosed technology relates to an electronic apparatus including a processor, a touch-sensitive display, and an accelerometer. An exemplary method includes receiving in the processor an acceleration value outputted by the accelerometer in response to a user touching a position on the touch-sensitive display with a given velocity. The method includes associating the acceleration value with a function, such as the output of a musical note, indicated by a touched location on the touch-sensitive display. The method includes modifying the function, such as audible volume of the musical note, in accordance with the acceleration value.

39 Claims, 7 Drawing Sheets

(56) References Cited

U.S. PATENT DOCUMENTS

| | | | |
|---|---|---|---|
| 7,170,017 B2* | 1/2007 | Chiang et al. | 178/18.01 |
| 7,658,676 B2* | 2/2010 | Ohta | 463/37 |
| 7,956,847 B2* | 6/2011 | Christie | 345/173 |
| 2007/0070046 A1* | 3/2007 | Sheynblat et al. | 345/173 |
| 2007/0222768 A1* | 9/2007 | Geurts et al. | 345/173 |
| 2008/0254824 A1 | 10/2008 | Moraes | |
| 2009/0207148 A1* | 8/2009 | Sugimoto et al. | 345/173 |
| 2009/0267904 A1* | 10/2009 | Mak-Fan et al. | 345/173 |
| 2009/0303198 A1* | 12/2009 | Yilmaz et al. | 345/173 |
| 2010/0073318 A1* | 3/2010 | Hu et al. | 345/174 |
| 2011/0005367 A1 | 1/2011 | Hwang et al. | |
| 2011/0191674 A1* | 8/2011 | Rawley et al. | 715/702 |
| 2011/0275412 A1* | 11/2011 | Khawand | 455/566 |
| 2011/0316793 A1* | 12/2011 | Fushiki | 345/173 |

OTHER PUBLICATIONS

PCT/US2011/048648 International Search Report and Written Opinion of the International Searching Authority; mailed on Dec. 23, 2011 (11 pages).

Office Action issued in German Patent Application No. 102011081435.3 on Jun. 4, 2013, 10 pages in German; English translation 3 pages.

http://createdigitalmusic.com/2009/05/brute-force-technology-zen-piano-for-iphone-senses-tap-pressure-but-not-by-magic; retrieved on Nov. 18, 2013, 6 pages.

http://forums/blipinteractive.co.uk/node/327, retrieved on Nov. 18, 2013, 8 pages.

GB Examination report for application No. GB1115129.7 mailed on Sep. 24, 2013, 5 pages.

* cited by examiner

LPF: $X_w = X_w \times 0.9 + I \times 0.1$ ⌒402

HPF: $X_y = X_y \times 0.1 + I \times 0.9$ ⌒404

$$\frac{|X_y - X_w|}{10\text{ms period}}$$ ⌒406

FIG. 4

$$\frac{\text{Constant}}{\text{Distance}} = \text{Scaling factor}$$

$$\frac{\text{Constant}}{\text{Distance}} = \text{Scaling factor}$$

ACCELEROMETER DETERMINED INPUT VELOCITY

FIELD

The following relates to determining velocity of an input on a touch screen device based on data from an accelerometer.

BACKGROUND

Acoustic musical instruments, such as drums and pianos for example, are typically velocity sensitive. This means that when a user hits a drum softly, a quiet sound is produced. Similarly, when the user hits the drum with a high velocity, a loud sound is produced. When a user hits a piano key softly, a quiet sound is produced, and when a user hits a piano key with more force, a loud sound is produced. This velocity-sensitive property allows musicians to create more expressive sounds and music.

Input devices for a Digital Audio Workstation (DAW) can include velocity sensitive keys or pads. For example, a MIDI keyboard can include velocity sensitive keys that allow a user to create expressive sounds and music with desired variations in sound volume. These velocity sensitive input devices can also be configured to modify sound characteristics, other than volume, based on detected note velocity.

However, many touch screen inputs are not velocity sensitive. Therefore, for example, a user creating music on a DAW running on a non-velocity-sensitive touch screen wireless device will not be able to create music with intended variations in volume, or other functions, based on velocity of input.

Therefore, users can benefit from a method for estimating input velocity of an input on a touch screen device based on data from other existing hardware in the touch screen device. This can allow a user to create expressive music with velocity and other variations.

SUMMARY

The disclosed technology relates to an electronic apparatus including a processor, a touch-sensitive display and an accelerometer. An exemplary method includes receiving in the processor an acceleration value outputted by the accelerometer. The method includes associating the acceleration value with a function indicated by a touched location on the touch-sensitive display. The method includes modifying the function in accordance with the acceleration value.

In one example, the function is the output of a musical note and modifying the function includes modifying an audible volume, pitch, or attack time of the musical note. In another example, the method includes scaling the acceleration value with a scaling factor when more than one touched location exists on the display, for example, multiple fingers of a user are touching the touch-sensitive display. In this example, the scaling factor can be determined by a distance between touched locations on the display, for example, between an input and a nearest finger resting on the touch-sensitive display.

In another example, the scaling factor can be adjusted in accordance with the position of the touched location on the display. In this example, the scaling factor can be adjusted based on a position such as a center of the touch-sensitive screen or in a corner of the touch-sensitive screen.

Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 4 illustrates exemplary formulas for filtering outputs from an accelerometer with a low pass filter and high pass filter;

DETAILED DESCRIPTION

The method, system, and computer-readable medium for modifying a function in accordance with a received acceleration value described herein can be implemented on a computer. The computer can be a data-processing system suitable for storing and/or executing program code. The computer can include at least one processor that is coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data-processing systems or remote printers or storage devices through intervening private or public networks. Modems, cable modems, and Ethernet cards are just a few of the currently available types of network adapters. In one or more embodiments, the computer can be a desktop computer, laptop computer, or dedicated device.

Figure 1:
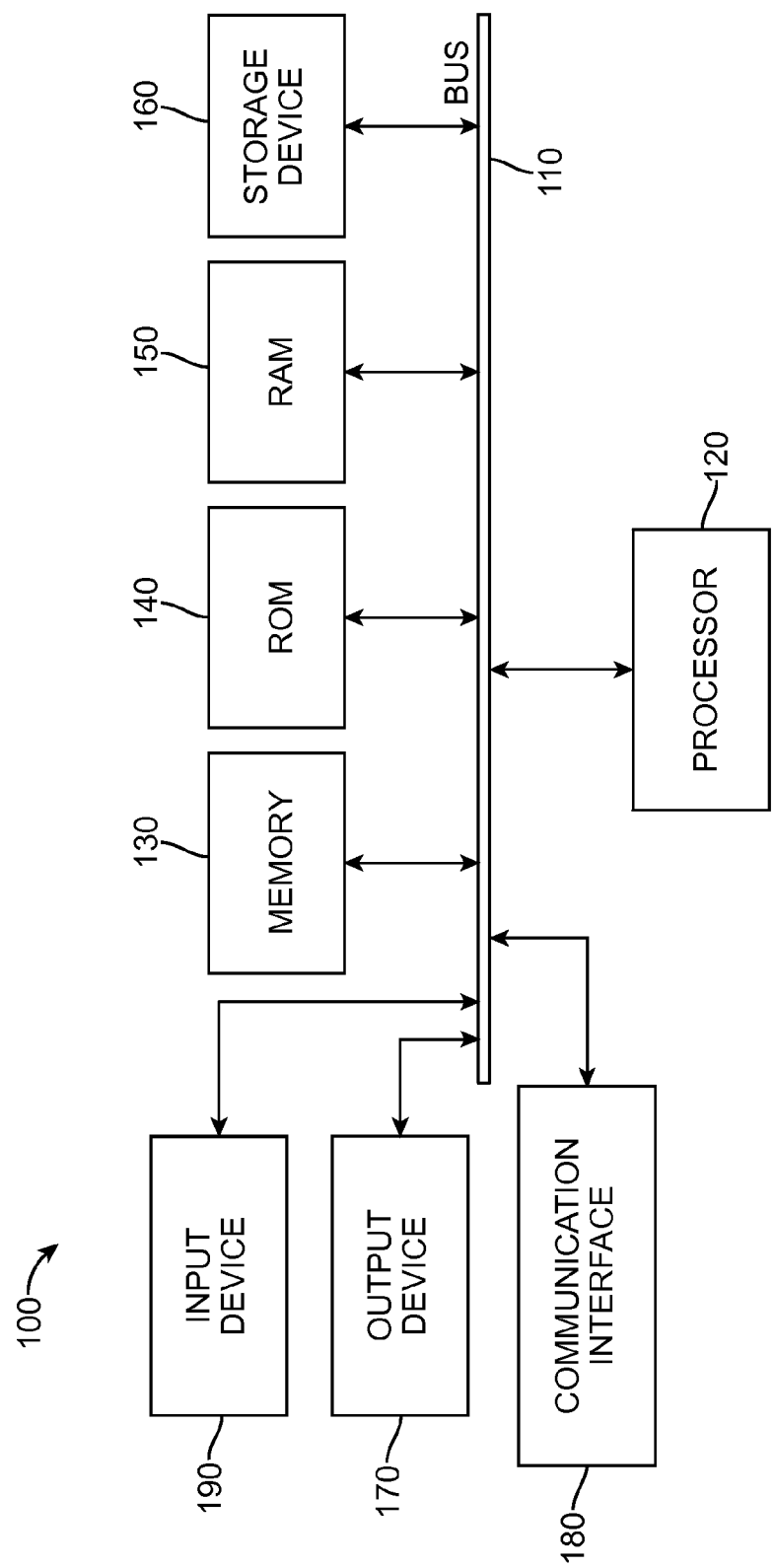
FIG. 1 illustrates hardware components associated with a system embodiment.

FIG. 1 illustrates the basic hardware components associated with the system embodiment of the disclosed technology. As shown in FIG. 1, an exemplary system includes a general-purpose computing device 100, including a processor, or processing unit (CPU) 120 and a system bus 110 that couples various system components including the system memory such as read only memory (ROM) 140 and random access memory (RAM) 150 to the processing unit 120. Other system memory 130 may be available for use as well. It will be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer-readable media provide non-volatile storage of computer-readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer-readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms such as a touch-sensitive screen for gesture or graphical input, accelerometer, keyboard, mouse, motion input, speech and so forth. The device output 170 can also be one or more of a number of output mechanisms known to those of skill in the art, such as a display or speakers. In some instances, multimodal systems enable a user to provide multiple types of input to communicate with the computing device 100. The communications interface 180 generally governs and manages the user input and system output. There is no restriction on the disclosed technology operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including but not limited to hardware capable of executing software. For example, the functions of one or more processors shown in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The technology can take the form of an entirely hardware-based embodiment, an entirely software-based embodiment, or an embodiment containing both hardware and software elements. In one embodiment, the disclosed technology can be implemented in software, which includes but may not be limited to firmware, resident software, microcode, etc. Furthermore, the disclosed technology can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers may not be included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk read only memory (CD-ROM), compact disk read/write (CD-R/W), and DVD. Both processors and program code for implementing each as aspects of the technology can be centralized and/or distributed as known to those skilled in the art.

Figure 2:
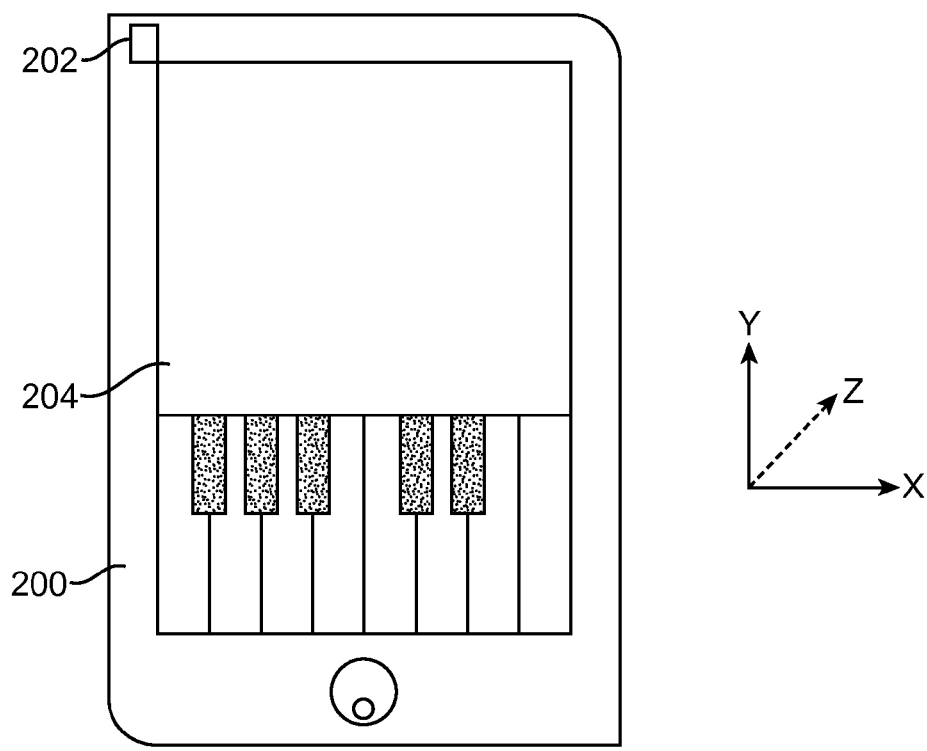
FIG. 2 illustrates a wireless touch screen device.

FIG. 2 illustrates a wireless touch screen device 200. The wireless touch screen device includes accelerometer 202. The accelerometer 202 can detect acceleration along 3 axes, (x,y, z) as shown. The accelerometer 202 can output a value for each axis periodically, such as every 10 milliseconds. In one embodiment, the processor only accepts outputted values from the accelerometer 202 in the z axis, because values corresponding to acceleration in the z axis correspond to the direction a user will tap the touch screen (into the screen) to input musical notes.

Wireless touch screen device includes a touch-sensitive display 204 and is executing a musical keyboard program that generates a musical note when a user taps over a displayed key.

Figure 3:
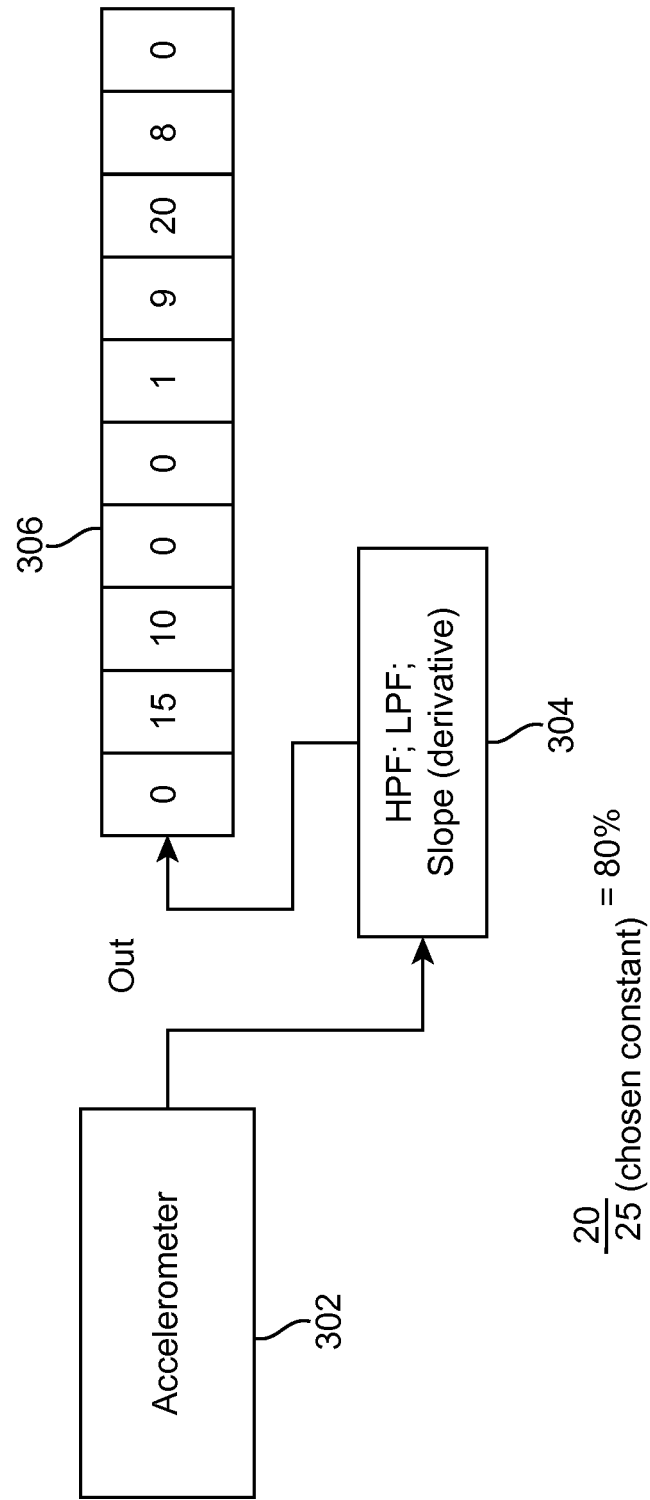
FIG. 3 illustrates hardware components associated with filtering and storing outputs from an accelerometer.

FIG. 3 illustrates hardware components associated with filtering and storing outputs from an accelerometer. FIG. 3 illustrates accelerometer 302, processor 304, and cache or memory 306.

Accelerometer 302 can output acceleration values periodically, such as every 10 milliseconds, and in this embodiment values corresponding to a z axis (into a touch screen) are sent to processor 304. Processor 304 performs calculations on the outputted acceleration values including high-pass filtering, low-pass filtering, and finding the slope of each value relative to its previous value. For example, if a first value is 0 and a second value is 15, the slope of the second value is 15. If a third value is 17, the slope of the third value is 2, and so on.

The slope or derivative of each value output by accelerometer 302 is stored in memory 306. In an embodiment, the memory stores the last 10 values, as shown in FIG. 3. As shown in memory 306, the newest value is 0, the second value is 15, the third value is 10, the fourth value is 0, the fifth value is 0, the sixth value is 1, the seventh value is 9, the eighth value is 20, the ninth value is 8, and the tenth value is 0.

In one embodiment, the processor can select the largest value within the 10 values stored in memory upon receiving an input from a touch screen from a wireless device, such as a tap on a touch screen over a musical key. For example, the processor can select the eighth value of 20 as the largest value, upon receiving an input. The processor can then take this value 20 and divide by a pre-defined constant, such as 25 as shown. In this example, 20/25=80%. Therefore, the tap on the touch screen over a musical key will result in a corresponding sound being generated at 80% of its maximum possible volume.

In another embodiment, if none of the values stored in memory 306 exceed a defined threshold, the processor is configured to receive a set number of additional values, such as five, and then the largest value from the additional values is selected if it exceeds the defined threshold. This embodiment allows the processor to compensate for delays. For example, if a user taps a screen over a musical note, but a not valid value is found in memory 306, the processor can receive additional values in case larger values corresponding to the tap are delayed for various reasons, such as hardware delay.

FIG. 4 illustrates exemplary formulas for filtering outputs from an accelerometer with a low pass filter and high pass filter. An embodiment, as shown in FIG. 4, acts as a low-pass filter and high-pass filter for incoming values. This allows low-frequency values to be filtered out, such as acceleration due to gravity. In this embodiment, a value output from the accelerometer for each tap is represented by the velocity of the tap alone, and not affected by a touch-screen's position or orientation relative to natural gravity caused by the Earth's gravitational field.

The embodiment as shown in FIG. 4 requires a memory to keep a running count for Xw and Xy. In this embodiment, upon reception of a new value from the accelerometer 302, the Xw value is updated by calculating (the old Xw value*0.9+the incoming value I*0.1) 402. This function acts to filter out low-frequency signals, such as gravity, for example.

Upon reception of the new value from the accelerometer 302, the Xy value is updated by calculating (the old Xy value*0.1+the incoming value I*0.9) 404. This function acts to filter out high-frequency signals, such as any noise not related to a user tapping on a touch-screen to generate musical notes.

After updating Xw and Xy based on the value received from the accelerometer 302, the absolute value of (Xy−Xw)/(time period between accelerometer outputs, such as 10 milliseconds) is used to calculate a new value 406. The processor 304 can store this new value in memory 306 of FIG. 3.

Although in this example values generated by the accelerometer 302 are filtered through a high-pass and low-pass filter, these operations are optional. Furthermore, the processor can employ other operations in modifying values received from the accelerometer before they are stored in memory.

Figure 5:
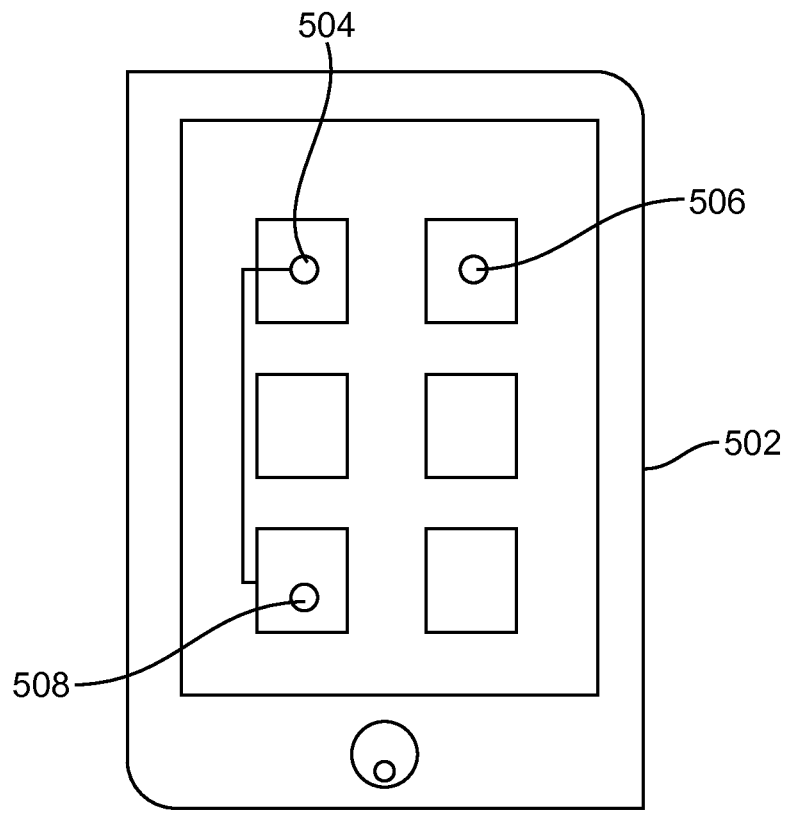
FIG. 5 illustrates a wireless touch screen device in which a user has tapped the touch screen with a finger to input a musical note, while other fingers are resting on the touch screen.

FIG. 5 illustrates a wireless touch screen device 502 in which a user has tapped the touch screen device on a touch-sensitive display with a finger to input a musical note, while other fingers are resting on the touch screen. The user's fingers are resting on positions 504 and 506. The user then taps at position 508 on the touch screen device. The resting fingers on positions 504 and 506 tend to dampen the response for an accelerometer built into the wireless touch screen device 502. Therefore, in this embodiment, a processor of wireless touch screen device 502 will apply a scaling factor to an accelerometer value detected in response to the user's tap at position 508.

In one embodiment, this scaling factor is based on distance from the user's tap at position 508 to a nearest resting finger position 504. In other embodiments, the scaling factor is based on other distances such as a distance from the user's tap at position 508 to a farthest resting finger position 506. Other distances and factors can be used to determine the scaling factor in other embodiments. The scaling factor can be applied to an output sound such that if the user's tap causes a processor to determine a 60% of maximum volume sound corresponding to a user's input velocity, after applying a scaling factor of 1.2, a 72% of maximum volume sound will be output. This allows the processor to compensate for a damping effect of resting fingers on a touch screen display. This damping effect tends to lower values output by the accelerometer 302. As shown, the scaling factor for a nearest resting finger on the touch screen display is represented by a constant divided by distance. This is merely illustrative and other configurations for determining an appropriate scaling factor can be used.

Figure 6:
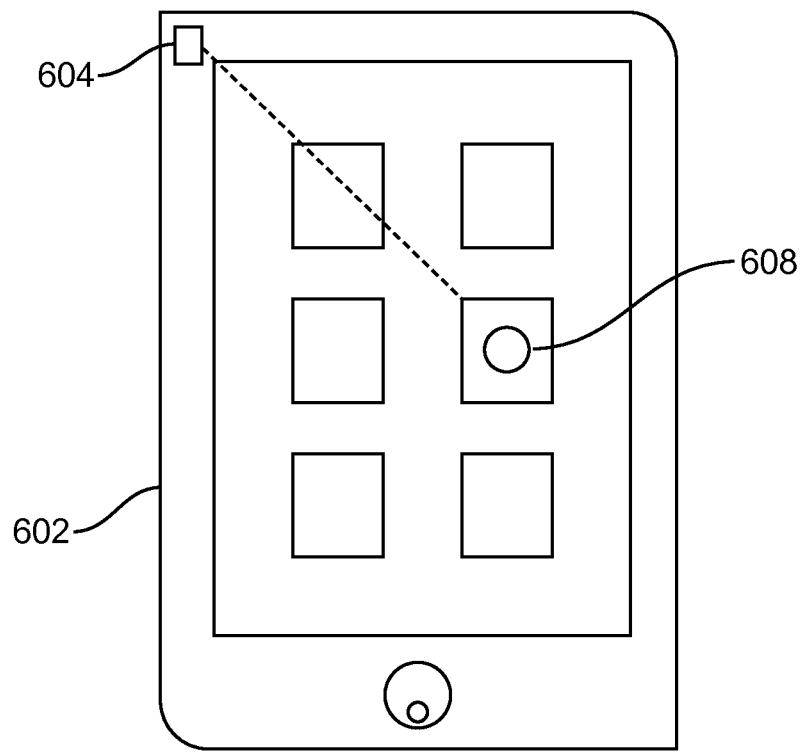
FIG. 6 illustrates a wireless touch screen device including an accelerometer in which a user has tapped the touch screen at a shown position relative to the accelerometer.

FIG. 6 illustrates a wireless touch screen device 602 including an accelerometer 604 in which a user has tapped the touch screen device at a shown position 608 relative to the accelerometer. Many wireless touch screen devices have curved shaped backs. With such devices, an accelerometer can output a relatively large value, when a user taps a position of the touch screen device in a corner, because the device moves a great deal when a user taps such a position in this corner location. In contrast, in this example, if the user taps a position of the touch screen device in a center of the touch screen the accelerometer might output a relatively smaller value, because the device will not move a great deal when the user taps such a center position. Therefore, the processor can apply a scaling factor based on the user's input position and its distance from a central position or its distance from an accelerometer. This scaling factor can increase the volume corresponding to user inputs received at a center position of the touch screen display or decrease the volume corresponding to user inputs received in a corner position of the touch screen display. As shown in FIG. 6, this scaling factor can take the form of a pre-defined constant/distance.

Figure 7:
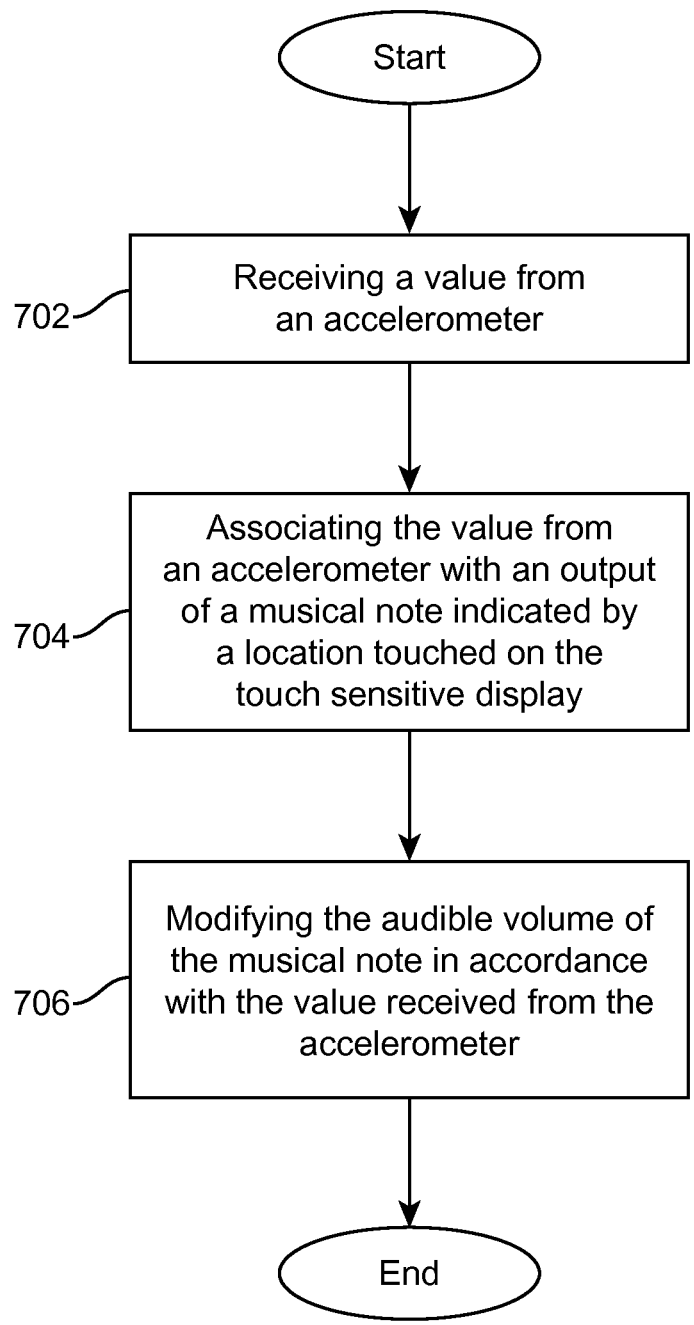
FIG. 7 is a flowchart for determining velocity of a musical note input on a touch screen based on data from an accelerometer.

FIG. 7 is a flowchart for determining velocity of a musical note input on a touch screen based on data from an accelerometer. Generally, the flow chart applies to an electronic apparatus including a processor, a touch-sensitive display and an accelerometer. At block 702, the method includes receiving in the processor an acceleration value outputted by the accelerometer. This value can be passed through a low-pass filter and high-pass filter to filter out unwanted noise. At block 704, the method includes associating the acceleration value with an output of a musical note indicated by a touched location on the touch-sensitive display. At block 706, the method includes modifying an audible volume of the musical note in accordance with the acceleration value. This allows a user to create expressive music with variations in volume, using a non-velocity sensitive touch screen device by utilizing output from existing hardware such as an accelerometer in the device. In other examples, the method includes modifying a pitch of said musical note to create vibrato, or modifying an attack time of said musical note. Modifications of other functions to the musical note can be implemented as well.

The method can further include an embodiment for scaling the audible volume of the musical note when other fingers are resting on the display during a user input. In this embodiment, the method includes scaling the acceleration value with a scaling factor when more than one touched location exists on the display. In one example, the scaling factor is determined by a distance between touched locations on the display. The higher the distance, the higher the scaling factor.

In another embodiment, the scaling factor is adjusted in accordance with the position of the touched location on the display. This embodiment can be implemented when a touch-screen device has a curved-back, that causes an accelerometer to output a relative large value, when a user taps a position of the touch screen device in a corner, because the device moves a great deal when a user taps such a position in this corner location. In contrast, in this example, if a user taps a position of the touch screen device in a center of the touch screen, the accelerometer might output a relatively smaller value, because the device will not move a great deal when a user taps such a center position. This adjustment of the scaling factor helps to compensate for equal velocity readings at all positions on a touch screen device.

In another embodiment, modifying the audible volume of the musical note can further include storing a predetermined number of acceleration values received in a predetermined period of time with respect to the touched location on the display and using the largest stored value as the acceleration value that modifies the function. Storing a predetermined number of acceleration values allows the processor to choose a largest value from a recent group, and can allow for software or hardware delays from when a user taps the touch-sensitive display and the accelerometer outputs a value corresponding to the tap or input.

Another embodiment can include comparing the predetermined number of stored acceleration values with a minimum threshold value, and storing additional acceleration values received from the accelerometer when none of the predetermined numbers exceed the threshold value, and using the additional stored acceleration values to determine the largest stored value. Therefore, if none of the stored values exceed a pre-defined threshold, the processor can store additional acceleration values to allow additional time to detect an appropriate value output from the accelerometer corresponding to a user's input.

In another embodiment, the output of the accelerometer is filtered prior to conversion to an acceleration value to compensate for gravitational influence and other noise on a response of the accelerometer to touching of the display.

Another method for modifying a function that is activated by touching a location on a touch-sensitive display is disclosed. The method includes receiving a value from an accelerometer coupled to the display. The method includes receiving coordinates of a location on the display that has been touched by a user. The method includes retrieving an output function corresponding to the received coordinates. The method includes modifying the output function in accordance with the received value. The method then includes outputting the modified function to an output device. In one embodiment of this method, the function is the playing of a musical note, and modifying the function comprises modifying the output volume of the note.

In one example, the output device is a speaker. The speaker can be built-in to a touch-sensitive device or external to the device. In one example, the method further includes storing a predetermined number of accelerometer values received in a predetermined period of time with respect to receiving the coordinates and using the largest stored value as the received value that modifies the function. In another example, this method includes comparing the predetermined number of stored accelerometer values with a minimum threshold value, storing additional accelerometer values received from the accelerometer when none of the predetermined numbers exceed the threshold value, and using the additional stored accelerometer values to determine the largest stored value. Furthermore, in another example of this method, the output of the accelerometer is filtered prior to conversion to an acceleration value to compensate for gravitational influence on a response of the accelerometer to touching of the display.

In the MIDI standard, volumes range from 0-127. In one embodiment, a user can desire to force all note volumes into a further user defined range of volumes. For example, a user can desire to force all note volumes into a 0-60 volume range. In another example, a user can desire to force all note volumes within a 100-127 range. In one embodiment, a processor can cause display of a graphical user interface to allow a user to specify such a range. The graphical user interface can display two bars, and a user can input a command to move a top and lower bar to specify a desired range. For example, if a user places the lower bar at 30 and the upper bar at 100, the processor can adjust any note volume lower than 30 to be 30. Similarly, the processor can adjust any note volume larger than 100 to be 100. In this example, the processor outputs all musical notes within the specific range specified by the user using the graphical user interface.

Embodiments within the scope of the present disclosure may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The above disclosure provides examples within the scope of claims, appended hereto or later added in accordance with applicable law. However, these examples are not limiting as to how any disclosed embodiments may be implemented, as those of ordinary skill can apply these disclosures to particular situations in a variety of ways.

The invention claimed is:

1. An electronic apparatus comprising: an accelerometer configured to periodically output acceleration values that represent touch inputs on a touch-sensitive surface; and a processor configured to perform operations comprising:
receiving a plurality of acceleration values outputted by the accelerometer;
modifying each acceleration value of the plurality of acceleration values according to a mathematical function to provide a plurality of modified acceleration values;
selecting a largest modified acceleration value of the plurality of modified acceleration values;
determining a ratio of the largest modified acceleration value and a constant that is greater than the largest modified acceleration value;
associating the determined ratio modified acceleration value with an audio function indicated by a touched location on a touch-sensitive display; and
modifying the audio function in accordance with the determined ratio.

2. The electronic apparatus as set forth in claim 1, wherein the audio function is the output of a musical note and modifying the audio function comprises modifying an audible volume of said musical note.

3. The electronic apparatus as set forth in claim 1, wherein the audio function is the output of a musical note and modifying the audio function comprises modifying a pitch of said musical note to create vibrato.

4. The electronic apparatus as set forth in claim 1, wherein the audio function is the output of a musical note and modifying the audio function comprises modifying an attack time of said musical note.

5. The electronic apparatus as set forth in claim 1, further comprising scaling each acceleration value of the plurality of acceleration values with a scaling factor when more than one touched location exists on the touch-sensitive display.

6. The electronic apparatus as set forth in claim 5, wherein said scaling factor is determined by a distance between touched locations on the touch-sensitive display.

7. The electronic apparatus as set forth in claim 6, wherein said scaling factor is adjusted in accordance with the position of said touched location on the touch-sensitive display.

8. The electronic apparatus as set forth in claim 1, wherein the selected modified acceleration value of the plurality of acceleration values is the largest modified acceleration value of the plurality of acceleration values, the method further comprising:
comparing each of the plurality of modified acceleration values with a minimum threshold value;
receiving additional modified acceleration values in response to determining that none of the plurality of modified acceleration values exceeds the threshold value; and
using the additional modified acceleration values to determine the largest modified acceleration value.

9. The electronic apparatus as set forth in claim 1, wherein output of said accelerometer is filtered prior to conversion to an acceleration value to compensate for gravitational influence on a response of said accelerometer to touching of said display.

10. A method for modifying an audio function that is activated by touching a location on a touch-sensitive display, comprising:
receiving a plurality of values from an accelerometer coupled to a touch-sensitive display, the plurality of values representing touch inputs on the touch-sensitive display;
modifying each value of the plurality of values according to a mathematical function to provide a plurality of modified values;
selecting a largest modified value of the plurality of values to be associated with the audio function;
determining a ratio of the largest modified value and a constant that is greater than the largest modified acceleration value;
receiving coordinates of a location on the touch-sensitive display that has been touched by a user;
retrieving the audio function corresponding to the received coordinates;
associating the determined ratio with the retrieved audio function;
modifying the audio function in accordance with the modified value; and
executing the audio function modified in accordance with the determined ratio to an output device.

11. The method as set forth in claim 10, wherein the audio function is the playing of a musical note, and modifying the audio function comprises modifying an output volume of said note.

12. The method as set forth in claim 10, wherein the audio function is the playing of a musical note, and modifying the audio function comprises modifying a pitch of said musical note to create vibrato.

13. The method as set forth in claim 10, wherein the audio function is the playing of a musical note, and modifying the audio function comprises modifying an attack time of said musical note.

14. The method as set forth in claim 10, wherein said output device is a speaker.

15. The method as set forth in claim 10, wherein the plurality of values are received in a predetermined period of time with respect to receiving said coordinates, and wherein the method further comprises storing the plurality of values.

16. The method as set forth in claim 15, further comprising;
storing the plurality of modified values;
determining that none of the stored plurality of modified values exceed a threshold value; and
in response to determining that none of the stored plurality of modified values exceed the threshold value:
receiving additional values from the accelerometer,
modifying each of the additional values to provide modified additional values, and
using the modified additional values to determine the ratio.

17. The method as set forth in claim 10, wherein modifying each value comprises filtering each value to compensate for gravitational influence on a response of said accelerometer to touching of said display.

18. A system comprising: a touch screen; an accelerometer; and
a processor executing instructions to perform operations comprising: receiving a plurality of acceleration values outputted by the accelerometer, the plurality of acceleration values representing touch input on the touch screen;
modifying each acceleration value of the plurality of acceleration values according to at least one of a high-frequency filtering function, a low-frequency filtering function, or a slope derivation function resulting in a plurality of modified acceleration values;
selecting a largest modified acceleration value of the plurality of modified acceleration values;
determining a ratio of the largest modified acceleration value and a constant that is greater than the largest modified acceleration value;

associating the determined ratio with an audio function indicated by a touched location on said touch-sensitive display; and modifying the audio function in accordance with the determined ratio.

19. The system of claim 18, wherein the audio function is the output of a musical note and the operations further comprise modifying an audible volume of said musical note.

20. The system of claim 18, wherein the audio function is the output of a musical note and the operations further comprise modifying a pitch of said musical note to create vibrato.

21. The system of claim 18, wherein the audio function is the output of a musical note and the operations further comprise modifying an attack time of said musical note.

22. The system of claim 18, the operations further comprising scaling each acceleration value with a scaling factor when more than one touched location exists on said display.

23. The system of claim 22, wherein said scaling factor is determined by a distance between touched locations on said display.

24. A non-transitory computer-readable storage medium storing instructions which, when executed by a computing device, cause the computing device to perform operations comprising:

receiving a plurality of acceleration values from an accelerometer, the plurality of acceleration values representing touch inputs on a touch-sensitive surface;

modifying each acceleration value of the plurality of acceleration values according to a mathematical function to provide a plurality of modified acceleration values;

selecting a largest modified acceleration value of the plurality of modified acceleration values;

determining a ratio of the largest modified acceleration value and a constant that is greater than the largest modified acceleration value;

associating the determined ratio with an audio function indicated by a touched location on the touch-sensitive display; and modifying the audio function in accordance with the determined ratio.

25. The non-transitory computer-readable storage medium of claim 24, wherein the audio function is the output of a musical note and modifying the audio function comprises modifying an audible volume of said musical note.

26. The non-transitory computer-readable storage medium of claim 24, wherein the audio function is the output of a musical note and modifying the audio function comprises modifying a pitch of said musical note to create vibrato.

27. The non-transitory computer-readable storage medium of claim 24, wherein the audio function is the output of a musical note and modifying the audio function comprises modifying an attack time of said musical note.

28. The non-transitory computer-readable storage medium of claim 24, the operations further comprising scaling each acceleration value with a scaling factor when more than one touched location exists on said display.

29. The non-transitory computer-readable storage medium of claim 28, wherein said scaling factor is determined by a distance between touched locations on said display.

30. The non-transitory computer-readable storage medium of claim 29, wherein said scaling factor is adjusted in accordance with the position of said touched location on said display.

31. The apparatus of claim 1, wherein the plurality of acceleration values are consecutively outputted by the accelerometer, and wherein modifying each acceleration value of the plurality of acceleration values according to a mathematical function comprises applying the mathematical function to each of the consecutively outputted plurality of acceleration values.

32. The apparatus of claim 1, wherein the mathematical function is at least one of a high-pass filtering function, a low-pass filtering function, or a slope determination function, and wherein the operations further comprise storing each modified acceleration value of the plurality of modified acceleration values.

33. The apparatus of claim 1, wherein modifying the audio function in accordance with the determined ratio comprises:

assigning the ratio to the audio function such that in response to a touch at the touched location on the touch-sensitive display, the audio function executes to output a maximum audio function value multiplied by the determined ratio.

34. The apparatus of claim 33, further comprising modifying the ratio by a scaling factor is determined by a distance between touched locations on the touch-sensitive display.

35. The method of claim 10, wherein the plurality of values are consecutively outputted by the accelerometer, and wherein modifying each value of the plurality of values according to a mathematical function comprises applying the mathematical function to each of the consecutively outputted plurality of values.

36. The system of claim 18, wherein the plurality of acceleration values are consecutively outputted by the accelerometer, and wherein modifying each acceleration value of the plurality of acceleration values according to at least one of a high-frequency filtering function, a low-frequency filtering function, or a slope derivation function comprises applying the at least one of a high-frequency filtering function, a low-frequency filtering function, or a slope derivation function to each of the consecutively outputted plurality of acceleration values.

37. The non-transitory computer-readable storage medium of claim 24, wherein the plurality of acceleration values are consecutively outputted by the accelerometer, and wherein modifying each acceleration value of the plurality of acceleration values according to a mathematical function comprises applying the mathematical function to each of the consecutively outputted plurality of acceleration values.

38. The non-transitory computer-readable storage medium of claim 24, wherein modifying the audio function in accordance with the determined ratio comprises:

assigning the ratio to the audio function such that in response to a touch at the touched location on the touch-sensitive display, the audio function executes to output a maximum audio function value multiplied by the determined ratio.

39. The medium of claim 24, wherein modifying an acceleration value to provide a modified acceleration value comprises:

filtering, based on a previously determined modified acceleration value, low-frequency signals associated with the modified acceleration value;

filtering, based on the previously determined modified acceleration value, high-frequency signals associated with the modified acceleration value; and determining a ratio of a difference between the modified acceleration value from which the high-frequency signals have been filtered and the modified acceleration value from which the low-frequency signals have been filtered, and a time period between two successive acceleration values outputs by the accelerometer.

* * * * *

UNITED STATES PATENT AND TRADEMARK OFFICE
CERTIFICATE OF CORRECTION

PATENT NO.         : 8,884,888 B2                                        Page 1 of 1
APPLICATION NO.    : 12/871507
DATED              : November 11, 2014
INVENTOR(S)        : Robert Michael Chin It is certified that error appears in the above-identified patent and that said Letters Patent is hereby corrected as shown below:

Claims

In Column 9, In Line 12-13, In Claim 1, after "ratio" delete "modified acceleration value".

In Column 10, In Line 36, In Claim 16, delete "comprising;" and insert -- comprising: --, therefor.

Signed and Sealed this
Twenty-fourth Day of November, 2015

Michelle K. Lee
*Director of the United States Patent and Trademark Office*